(No Model.)
T. McSWEENEY.
PIPE JOINT FOR GAS MAINS.
No. 341,266. Patented May 4, 1886.
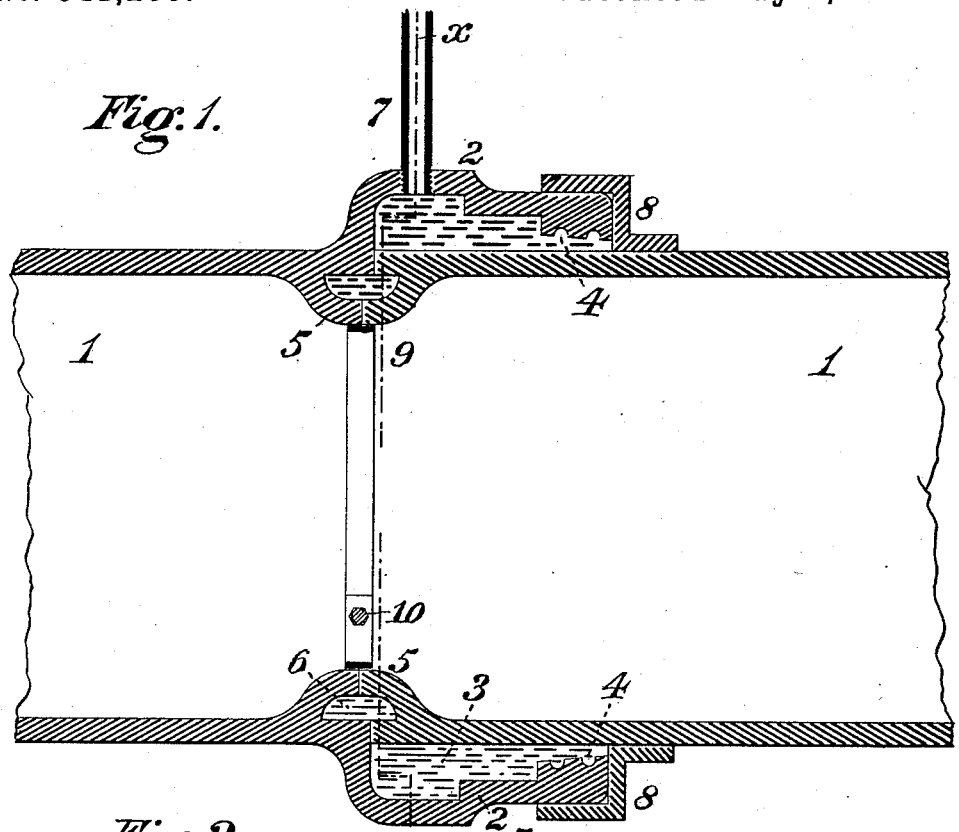
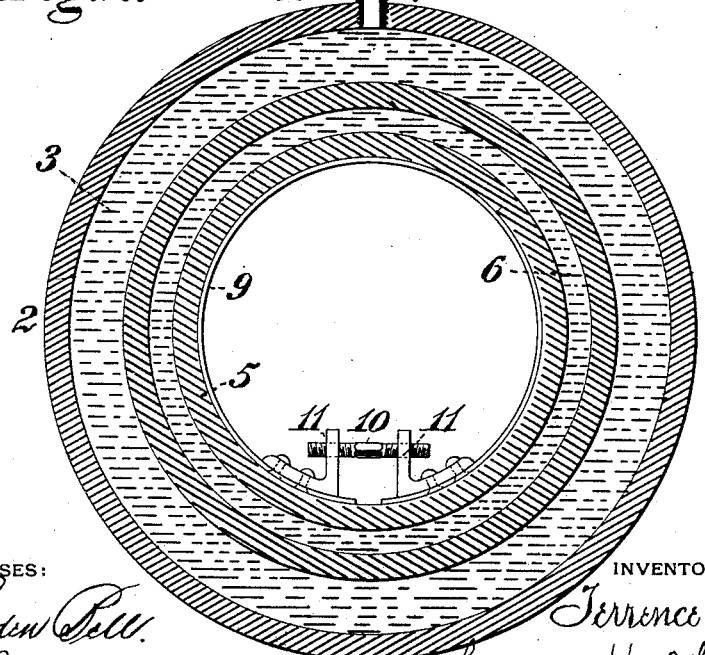
WITNESSES:
INVENTOR,
Terrence McSweeney
George H. Christy Att'y.

United States Patent Office.

TERRENCE McSWEENEY, OF ALLEGHENY, ASSIGNOR TO THOMAS A. GILLESPIE, OF PITTSBURG, PENNSYLVANIA.

PIPE-JOINT FOR GAS-MAINS.

SPECIFICATION forming part of Letters Patent No. 341,266, dated May 4, 1886.

Application filed March 15, 1886. Serial No. 195,208. (No model.)

*To all whom it may concern:*

Be it known that I, TERRENCE McSWEENEY, residing at Allegheny, in the county of Allegheny and State of Pennsylvania, a citizen of the United States, have invented or discovered a certain new and useful Improvement in Pipe-Joints for Gas-Mains, of which improvement the following is a specification.

In the accompanying drawings, which make part of this specification, Figure 1 is a longitudinal central section through a pipe-joint embodying my invention, and Fig. 2 a transverse section through the same at the line $xx$ of Fig. 1.

My invention relates to joints for the connection of cast-iron pipe-sections forming a line or main for the conveyance of gas or other fluids; and its object is to provide a joint of the bowl-and-spigot type of simple and inexpensive construction, and which shall effectively resist leakage of fluid from the main.

To this end my invention, generally stated, consists in the combination of a pipe-section having a bowl or socket on one of its ends adapted to receive and form a packing-space around the end of an adjacent section, and an annular internal flange or lip, and a plain or spigot ended pipe-section having a corresponding internal flange, said flanges forming a supplemental packing-chamber within the shell of the pipe-sections.

The improvement claimed is hereinafter fully set forth.

In the practice of my invention I form upon one end of a pipe-section, 1, a bowl or socket, 2, of diameter sufficient to inclose the plain or spigot end of the adjacent pipe-section 1, and form around the same an external packing space or chamber, 3, adapted to serve as a receptacle for any suitable semi-liquid or plastic material which is to be supplied to and allowed to solidify under pressure in the chamber. The bowl 2 is reduced in diameter at and adjacent to its outer end, one or more grooves or recesses, 4, being formed circumferentially in the reduced portion of its bore, for the purpose of receiving, if desired, an end packing of soft metal, which may be calked around its outer face in the ordinary manner. An annular flange or lip, 5, is formed upon the inner surface of the shell of the pipe-section adjacent to the bowl 2, said flange terminating in or nearly in the transverse plane of the shoulder of the bowl, and a corresponding flange, 5, is formed within the plain or spigot end of the adjacent pipe-section, the space between said flanges and the shells of the sections forming, when the sections are brought together to make a joint, an annular supplemental packing-chamber, 6, separated by the thickness of the shells of the sections from the external packing-chamber, located between the bowl and the outer surface of the spigot-section, and communicating with said external chamber only through the joint between the shoulder of the bowl and the end of the shell of the spigot.

The chambers 3 and 6 may be packed with any suitable semi-liquid or plastic material or compound capable of being introduced while in a liquid condition and of subsequently setting or hardening, a compound which is desirably adaptable to this purpose being set forth in a separate application filed by me of even date herewith. The specific material or compound employed is not, however, an essential of my present invention, so long as the same possesses the characteristics above stated. The packing material is introduced through a pipe, 7, leading into the external packing-chamber, 3, and is prevented from escaping outwardly therefrom by an external clamp or collar, 8, which is secured around the spigot-section against the outer end of the bowl. The escape of packing material from the supplemental chamber 6 into the main is prevented by an expansion-ring, 9, of metal, which fits against the flanges 5 on each side of their abutting faces, and is maintained closely against the same by a screw, 10, having right and left threads engaging nuts 11 on the ends of the expansion-ring.

The liquid packing material is supplied to the pipe 7 until it fills the outer packing-chamber, 3, and, passing by the joint between said chamber and the supplemental chamber 6, also fills the latter chamber. Pressure is then applied to the packing material by means of a plunger working in the supply-pipe 7, or in a pipe or vessel connected therewith, and is maintained until the setting or solidification of the material in both chambers has been completed.

The solidified packing, which adheres to the walls of the chambers and fills up all interstices of the joints, forms an effectual barrier to the leakage of fluid from the main, and, being located perpendicularly to the line of pressure of fluid tending to escape, acts advantageously to resist the same.

In lieu of closing the outer end of the external packing-chamber, 3, by the clamp 8, as above described, a packing of lead or other soft metal may be run into the space of reduced diameter within the bowl at and near its outer end, filling the same and its recesses or grooves 4, and being properly calked, in the usual manner, around the spigot-section and outer end of the bowl.

I claim herein as my invention—

1. A bowl-and-spigot pipe-joint having a supplemental packing-chamber located on the inside of the shells of the connected pipe sections, substantially as set forth.

2. The combination of a pipe-section having a bowl or socket on one of its ends and an annular internal flange or lip adjacent thereto, and a plain or spigot ended pipe-section having a corresponding internal end flange, said flanges abutting and forming a supplemental packing-chamber within the shells of the sections, substantially as set forth.

3. The combination of a pipe-section having a bowl or socket on one of its ends, which is reduced in diameter at and adjacent to its outer face, and an annular internal flange or lip adjacent to the shoulder of the bowl, a plain or spigot ended pipe-section inserted into the bowl, and having an annular internal flange abutting against the internal flange of the bowl and forming therewith a supplemental packing-chamber, a packing of soft metal fitted into the reduced end portion of the bowl, and a packing of solidified semi-liquid or plastic material filling the larger space within the bowl and the supplemental packing-chamber, substantially as set forth.

4. The combination of a pipe-section having a bowl or socket on one of its ends and an annular internal flange or lip adjacent thereto, a plain or spigot ended pipe-section having a corresponding internal end flange, said flanges abutting and forming a supplemental packing-chamber within the shells of the section, and an expansion-ring fitting against the flanges on each side of their abutting faces, substantially as set forth.

5. The combination of a pipe-section having a bowl or socket on one of its ends and an annular internal flange or lip adjacent thereto, a plain or spigot ended pipe-section having a corresponding internal end flange, said flanges abutting and forming a supplemental packing-chamber within the shells of the sections, and an external clamp or collar fitting around the spigot-section and closing the outer end of the bowl, substantially as set forth.

In testimony whereof I have hereunto set my hand.

TERRENCE McSWEENEY.

Witnesses:
J. SNOWDEN BELL,
R. H. WHITTLESEY.